United States Patent [19]
Hasson

[11] Patent Number: 5,873,732
[45] Date of Patent: Feb. 23, 1999

[54] APPARATUS FOR TRAINING FOR THE PERFORMANCE OF A MEDICAL PROCEDURE

[76] Inventor: Harrith M. Hasson, 2043 N. Sedgwick, Chicago, Ill. 60614

[21] Appl. No.: 938,636

[22] Filed: Sep. 26, 1997

[51] Int. Cl.⁶ .................................................... G09B 23/28
[52] U.S. Cl. ............................................................ 434/262
[58] Field of Search ................................... 434/262, 267, 434/272

[56] References Cited

U.S. PATENT DOCUMENTS

| | | | |
|---|---|---|---|
| 5,061,187 | 10/1991 | Jerath | 434/262 |
| 5,149,270 | 9/1992 | McKeown | 434/262 |
| 5,230,630 | 7/1993 | Burgett | 434/262 |
| 5,403,191 | 4/1995 | Tuason | 434/262 |
| 5,425,644 | 6/1995 | Szinicz | 434/267 X |
| 5,620,326 | 4/1997 | Younker | 434/272 X |

FOREIGN PATENT DOCUMENTS 1298794  3/1987  U.S.S.R. ................................ 434/262

Primary Examiner—John A. Ricci
Attorney, Agent, or Firm—Wood, Phillips, VanSanten, Clark & Mortimer

[57] ABSTRACT

A training apparatus has a frame defining a working space simulating a body cavity and an access opening in communication with the working space to allow introduction of an instrument to the working space from externally of the working space. A first model is provided upon which a procedure can be performed with an instrument to at least one of a) simulate a medical procedure and b) practice a movement that may be encountered in the performance of a medical procedure The first model and frame cooperate in such a manner that the first model is allowed to be selectively maintained on the frame in a plurality of different positions relative to the access opening.

43 Claims, 5 Drawing Sheets

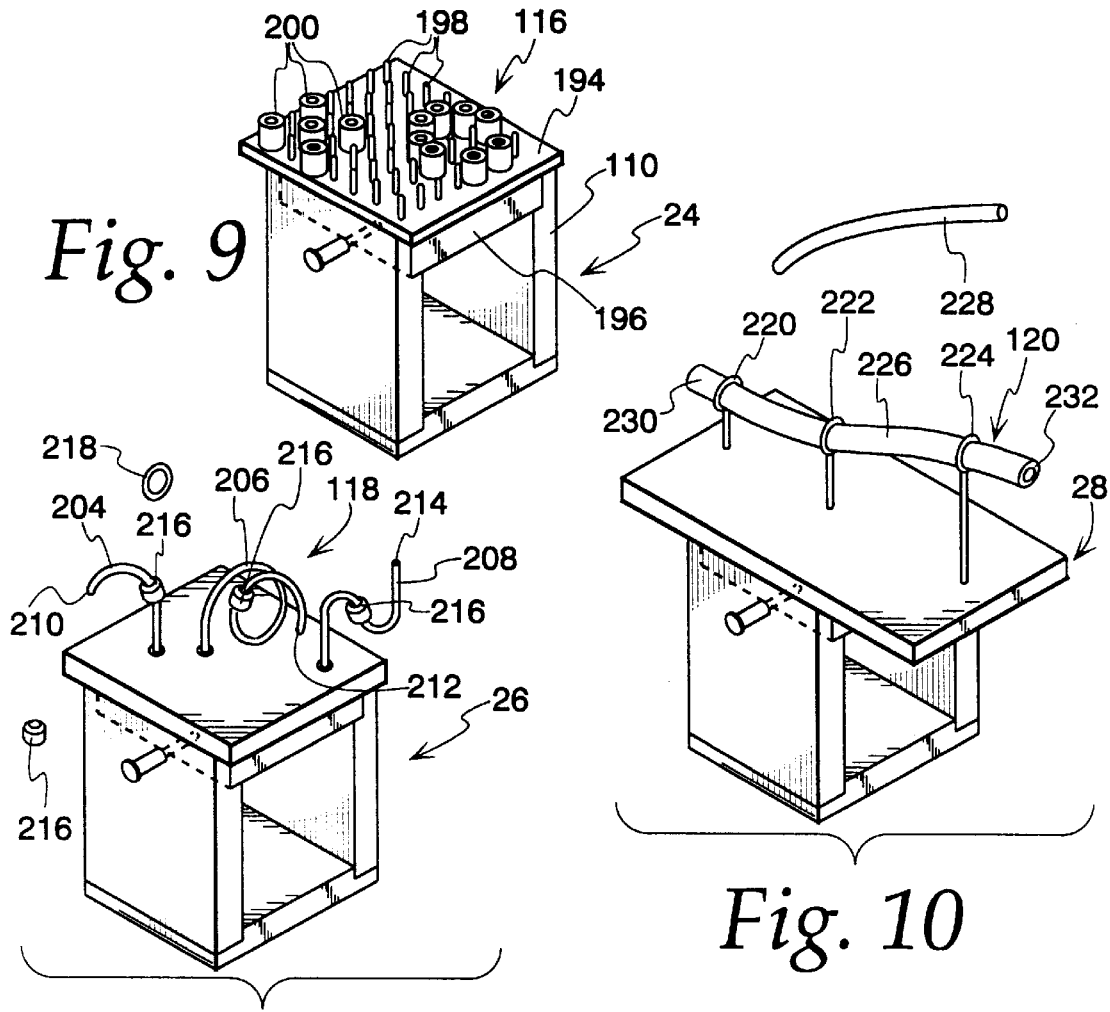
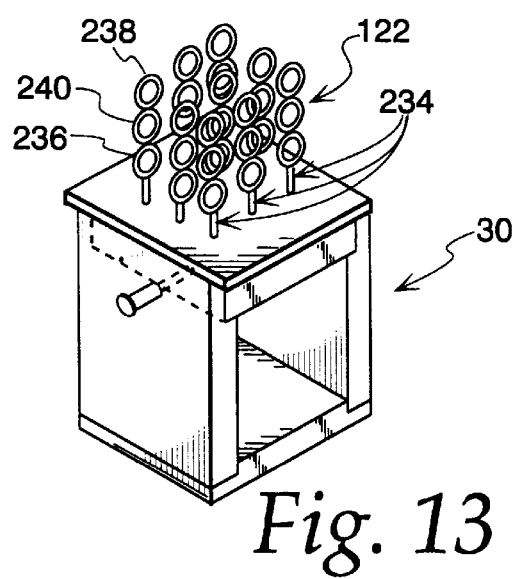
Fig. 9
Fig. 10
Fig. 11
Fig. 12
Fig. 13

APPARATUS FOR TRAINING FOR THE PERFORMANCE OF A MEDICAL PROCEDURE

BACKGROUND OF THE INVENTION

1. Field of the Invention

This invention relates to medical procedures and, more particularly, to a training apparatus that can be used to at least one of a) simulate a medical procedure and b) practice a movement that may be encountered in the performance of a medical procedure.

2. Background Art

The performance of laparoscopy requires precise and controlled manipulation of medical instruments. Acquiring skills in video laparoscopy is time consuming and difficult. This is due to problems with orientation and handeye coordination associated with manipulating three dimensional objects that are viewed in a two dimensional format on a monitor.

The learning curve in the operating room can be shortened by using training models. The models may be animate or inanimate. Animate models are realistic, but they require elaborate preparation, logistics and great expense. Further, because of humane considerations, training on animate objects is frowned upon. These factors contribute to the impracticality of using animate objects in training to perform laparoscopy.

Inanimate training objects are commonly used. A number of these available trainers are cumbersome, unrealistic, ineffective and expensive. There are available models of human anatomy which, while lifelike, are expensive and may be useable only once to practice a particular procedure.

For training aides that have a fixed configuration, only limited movements and procedures may be practically carried out.

All of the above factors contribute to doctors' often practicing less than is desirable for laparoscopy. This is particularly a problem given that laparoscopy is one of the more demanding types of surgery. Repetitive movements may be required to develop the dexterity and hand-eye coordination necessary for successful surgical outcomes.

Ideally, surgeons wish to have available to them a relatively inexpensive structure which is unobtrusive and which can be conveniently employed to allow surgeons, in their available time, to practice and perfect surgical skills.

SUMMARY OF THE INVENTION

In one form of the invention, a training apparatus has a frame defining a working space simulating a body cavity and an access opening in communication with the working space to allow introduction of an instrument to the working space from externally of the working space. A first model is provided upon which a procedure can be performed with an instrument to at least one of a) simulate a medical procedure and b) practice a movement that may be encountered in the performance of a medical procedure The first model and frame cooperate in such a manner that the first model is allowed to be selectively maintained on the frame in a plurality of different positions relative to the access opening.

The cooperating structure on the first model and frame may include cooperating surfaces on the first model and frame which guide movement of the first model in a predetermined path relative to the frame to allow the first model to be selectively repositioned relative to the access opening in the frame.

The frame may have an elongate rail defining the cooperating surface on the frame which engages the cooperating surface on the first model and guides the first model in a substantially straight line in the predetermined path.

A locking mechanism may be operable to selectively, releasably fix the first model in a plurality of different positions relative to the frame.

The cooperating surfaces on the frame may be surfaces which can be selectively engaged with the cooperating surface on the first model to selectively guide the first model in first and second independent paths relative to the frame.

In one form, the frame has three rails, each having a surface to engage the cooperating surface on the first model and guide the first model selectively in one of three different predetermined paths, with each of the predetermined paths being substantially straight and parallel to the others.

In one form, the first model has a first base, a first platform with an exposed surface, and a resilient element between the first base and first platform which deforms to allow the platform to universally reposition relative to the base, with the cooperating surface on the first model being defined by the base.

The first platform may be removably connected to the first base. A second base may be provided having a different configuration than the first base to which the first platform is capable of being removably connected.

The first model may have a first base and a first platform operably connected to the first base for guided movement relative to the first base.

At least part of the first platform may be connected to the first base for pivoting movement relative to the first base around a first axis.

In one form, the first model has a first base, a first platform on the first base, and a practice system on the first platform.

The practice system may have a plurality of elements, each having an opening with an axis, with the axes of a plurality of the openings being non-coincident. The axes of a plurality of the openings may be coincident.

A plurality of the openings may be defined by a plurality of the elements which have an annular shape. The annular elements may be stacked one on the other to define a stack subassembly. A plurality of the stack subassemblies can be provided on the first platform.

The practice system may have a cantilevered wire element on the first platform having a body with a free end. An annular element may be provided with an opening to receive the free end of the body and at least part of the body.

At least part of the body may be non-straight or curved with one or multiple curves.

The practice system may include a flexible tube and a support for maintaining at least a part of the flexible tube in spaced relationship to the platform.

The practice system may include a flexible element and first and second clamps which engage the flexible element to maintain at least part of the flexible element spaced from the first platform. The flexible element may be in a tensioned state between the first and second clamps.

The practice system may have third and fourth clamps which engage the flexible element.

In one form, the first clamp has a spacing from the first platform that can be varied.

A clamp can be provided on the frame, independently of the first model, to engage the flexible element.

In one form, the practice system includes a piece of fruit.

In one form, the practice system is a peg board with a plurality of discrete elements which can be placed in selected locations on the peg board.

A post may project from the frame in cantilever fashion to facilitate tying of knots in an elongate flexible element.

A camera may be mounted on the frame for photographing the working space. The camera may be mounted to be movable guidingly relative to the frame.

A resettable timer may be provided on the frame.

In one form, the access opening on the frame is at least partially covered by a flexible membrane which simulates live tissue.

A medical instrument can be directed through the flexible membrane into the working space.

A laparoscopic camera can be directed through the flexible membrane into the working space. A monitor may be provided to project a visible image generated by the camera.

In one form, the frame defines a ledge at least partially around the access opening. The membrane may have a frame which rests upon the frame ledge.

In one form, the first model has a first base, a first platform, and a first resilient element acting between the first base and first platform.

The first resilient element may be foam. The first resilient element may be removably attached to at least one of the first base and first platform.

In one form, the first resilient element maintains a first predetermined spacing between the first base and first platform and there is a second resilient element which acts between the first base and first platform with the first resilient element removed from both the first platform and first base, with the second resilient element having a different configuration than the first resilient element to maintain a second predetermined spacing between the first base and first platform that is different than the first predetermined spacing.

The resilient element may be removably attached to at least one of the first base and first platform through use of a hook and loop-type fastener.

A source of illumination may be provided within the working space.

BRIEF DESCRIPTION OF THE DRAWINGS

FIGS. 7–14 are perspective views of different models useable with the frame in FIGS. 1–3, according to the present invention;

DETAILED DESCRIPTION OF THE DRAWINGS

Figure 1:
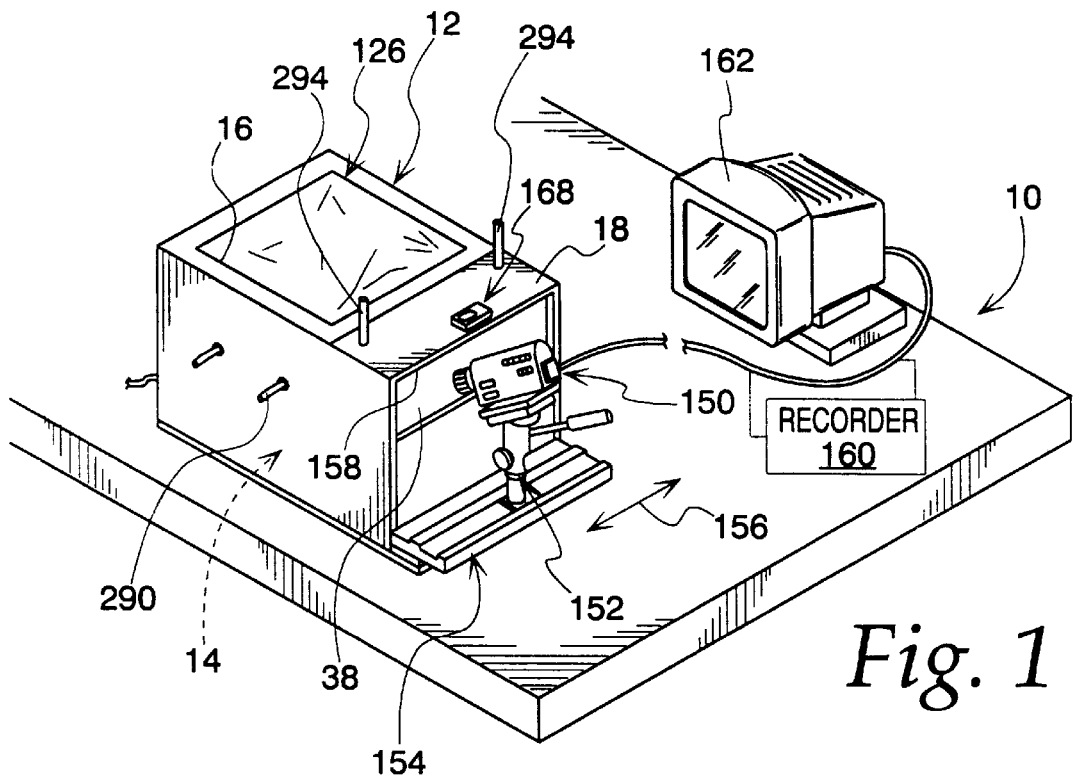
FIG. 1 is a perspective view of a training apparatus, according to the present invention, consisting of a frame defining a working space simulating a body cavity, a camera, and a monitor for projecting an image from the camera.

Referring initially to FIGS. 1–3, 5 and 6, a training apparatus, according to the present invention, is shown at 10. The training apparatus 10 consists of a frame 12 bounding a working space 14 which simulates a body cavity. The frame 12 is constructed so that the working space 14 has the general shape and dimensions of a distended human abdomen. An access opening 16 is provided through the top wall 18 of the frame 12 and defines a communication path from externally of the frame 12 to the working space 14 to allow introduction of a medical instrument to the working space 14 to simulate a laparoscopic procedure, as hereinafter described.

According to the invention, various models 20, 22, 24, 26 (FIG. 11), 28 (FIG. 10) and 30 (FIG. 13) are introduced to the working space 14 and are selectively positioned on the frame 12 relative to the access opening 16 to permit procedures to be carried out with medical instrument assemblies 32, which procedures either simulate a medical procedure or are used to practice a movement that may be encountered in the performance of a medical procedure. The models 20–30 are introduced to the working space 14 through a side wall opening 34 which is selectively exposed and covered by a hinged closure 36. With the closure 36 in the open state of FIG. 2, the models 20–30 can be introduced to the working space 14.

The models 20–30 are guided along the bottom wall 38 of the frame 12 through elongate, parallel spaced rails 40, 42, 44, 46. Exemplary rails 42, 44 each have a T-shaped cross-sectional configuration. The rail 42 defines a downwardly facing surface 48 and a vertically extending surface 50 which define in conjunction with the bottom wall 38 a receptacle for a guide leg 52 on the model 22. The guide leg 52 has complementary surfaces 54, 56, 58 thereon which cooperate with the surfaces 48, 50 and bottom wall 38 to guide the model 22 back and forth in the line of the double-headed arrow 60 within the working space 14. The rail 44 has a like configuration and cooperates with a spaced guide leg 62 on the model 22 in like manner.

In this particular embodiment, the model 22 has a base 64 which is guided along the frame 12, a platform 66 on top of the base 64, and a practice system at 68 on top of the platform 66.

The base 64 is a unitary subassembly consisting of three peripheral wall panels 70, 72, 74 connected to a bottom wall 76 which defines the guide legs 52, 62. The wall parts 70, 72, 74 define an upwardly facing ledge 78 to support the platform 66. The platform 66 may have a peripheral rib 80 which is guided in a groove 82 in at least the wall parts 70, 72. Through this arrangement, the platform 66 can be translated in a direction into the page in FIG. 3 to cause the rib 80 to move into the groove 82 and guide movement of the platform 66 towards the wall part 74 until the platform 66 abuts to the wall part 74. A straight pin 84 can then be directed through the wall part 70 into the platform 66 to maintain this relationship.

With this arrangement, the guide legs 52, 62 can be engaged with the rails 42, 44 at the rail ends 86, 88 adjacent to the opening 34 and then slid to any desired location along the length of the rails 42, 44. When the desired location of the model 22 is achieved, a locking mechanism 90 can be operated. The locking mechanism 90 includes a plunger 92 that is normally biased by a coil spring 94 upwardly to a disengaged position. Through a pivoting cam lever 96, the plunger 92 can be driven downwardly against the force of the spring 94 through the bottom wall 76 of the model 22 to against the upwardly facing surface 100 of the bottom wall 38. This forces the guide legs 52, 62 biasably upwardly against the rails 42, 44 to thereby cause the base 64 and rails 42, 44 to be frictionally maintained in the desired relationship.

In the preferred form, the rail arrangement defines three independent paths 102, 104, 106 along which any of the models 20–30 can be moved. The line of the paths 102, 104, 106 parallels the vertical extent of the human body. Models 20–30 placed on the central path 104 represent midline abdominal structures such as the uterus, while those on the outer paths 102, 106 represent lateral structures such as the adnexa.

The models 20–30 preferably have a modular-type construction which allows interchange of elements. For example, the platform 66 could be moved from the base 64 and operatively connected to a base 110 on the model 24 or a base 112 on the model 20. The base 64 has a height H with the base 110 having a height H1 and the base 112 having a height H2. As examples, the base height H may be equal to five inches, the base height H1 may be equal to three inches, and the base height H2 may be equal to one inch. This affords the operator the flexibility of not only changing location of the models by translation in a horizontal plane but allowing height selection to more accurately simulate the conditions within the human body.

As will be explained in detail below, various configurations of practicing systems 68, 114, 116, 118 (FIG. 11), 120 (FIG. 10), 122 (FIG. 13), and 124 (FIG. 14) are interchangeably attachable to the platforms.

To use the apparatus 10, the operator can preselect and operatively join a desired base, platform, and practice system to build the desired model configuration. The closure 36 is repositioned to the FIG. 2 position, whereupon the models can be operatively engaged with the frame 12 to slide along the paths 102, 104, 106. Each model preferably has a locking mechanism 90 so that it can be fixed at a selected location within the working space 14. The door 36 can then be closed to block the frame opening 34.

To simulate human tissue, a membrane module 126 is placed over the access opening 16. The module 126 consists of a rectangular frame 128 which is supported upon an upwardly facing ledge 130 defined around the periphery of the access opening 16. Flexible, cloth, membrane layers 132, 134 are stretched tautly across the frame 128 and suitably secured thereto. The entire module 126 can then be put in place on the frame 12.

The operator can then direct medical instruments through the membrane layers 132, 134 from externally of the working space 14 to within the working space 14. In this case, the instrument 32 shown in FIG. 3 consists of a support 136, such as that shown in my U.S. Pat. No. 5,002,557. The support 136 defines a passageway through the membrane layers 132, 134 and provides a stable support for an instrument 138, which in this case is a forceps-type instrument with pivotable jaws 140, 142 which are remotely operable through finger grips 143. The layers 132, 134 preferably have a thickness and texture so that they cooperatively produce the flexibility of human tissue so that the operator has the same sensation as she/he does during an actual operation. In one form, three layers of rubber, sponge, and/or latex are used to define the membrane.

A separate support 144 is directed through the membrane layers 132, 134 at a location spaced from the support 136. A separate instrument, or in this case a laparoscopic camera 146, can be directed through the support 144. The camera 146 may produce a signal that is directed to a monitor 148 which produces a two dimensional image of the inside of the working space 14. With this arrangement, the operator can perform an operation under actual conditions, manipulating the various instruments while observing the monitor 148.

To either assist the performance of the various operations and/or to facilitate studying of the various operations performed in the working space 14, a video camera 150 can be incorporated into the system. The camera 150 is mounted upon a pedestal-type support 152 which is slidable guidingly along a track 154 in the line of the double-headed arrow 156. The camera 150 is positioned to have an unobstructed line of sight to the working space 14 through an opening 158 in the frame 12.

A video signal from the camera 150 can be directed to a recorder 160 and/or to a monitor 162, thereby allowing the operator to observe the monitor 162 during the procedure. Through the recorder 160, the video tape of the procedure(s) can be reproduced to allow the operator to study procedures and assess performance.

Fluorescent-type lights 164, 166 can be mounted to the frame 12 to illuminate the working space 14 to enhance visibility and quality of the recorded video.

A timer 168 is mounted on the frame 12 and is resettable to allow the operator to record the time taken to perform various procedures. This feature again is aimed at allowing self-assessment of performance, ultimately allowing the operator to increase not only effectiveness but efficiency.

Figure 2:
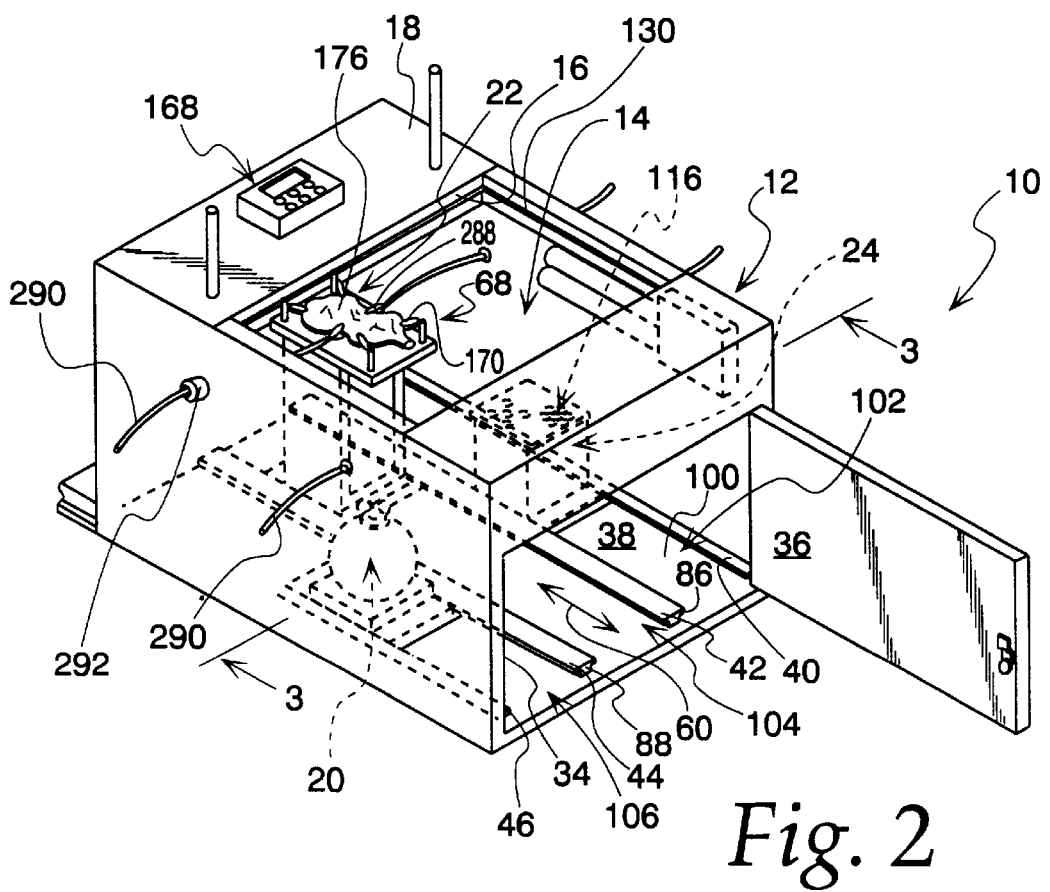
FIG. 2 is an enlarged, perspective view of the frame in FIG. 1 and with an access door opened to allow models to be selectively directed into the working space.
Figure 3:
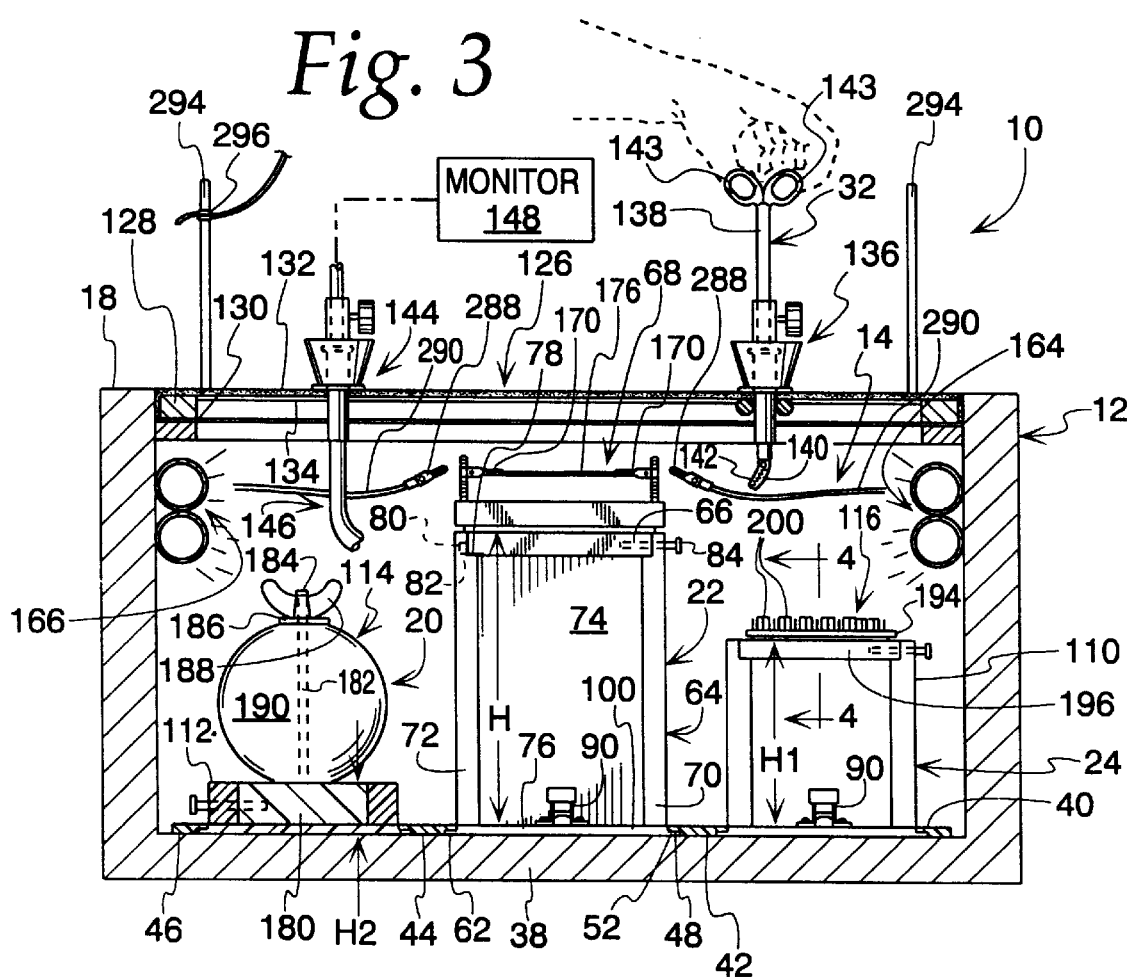
FIG. 3 is an enlarged, cross-sectional view of the frame taken along line 3—3 of FIG. 2.
Figure 5:
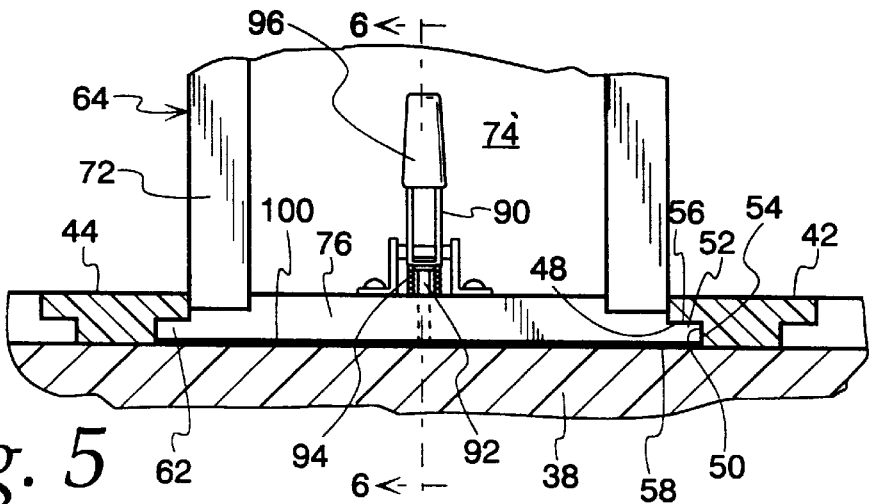
FIG. 5 is an enlarged, fragmentary, cross-sectional view of a connection between one of the models and the frame.
Figure 6:
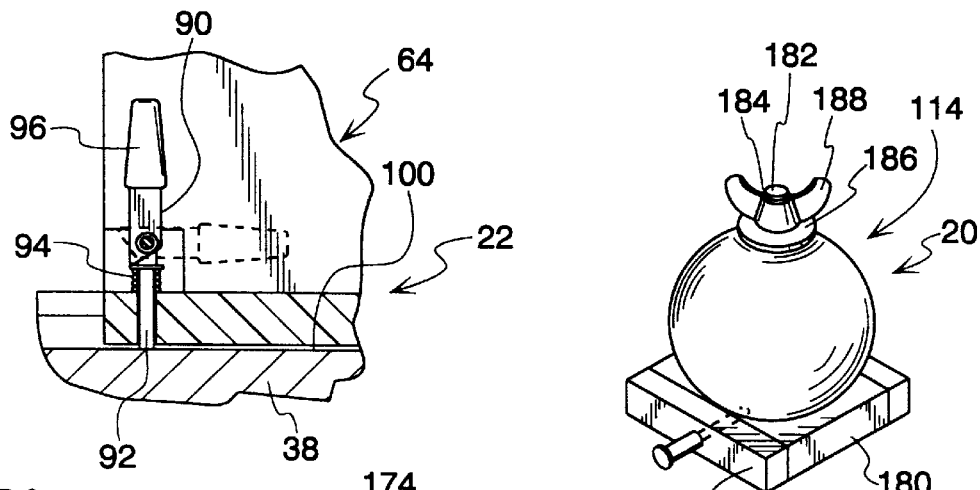
FIG. 6 is an enlarged, fragmentary, partial cross-sectional view of a locking mechanism on the model taken along line 6—6 of FIG. 5.
Figure 8:
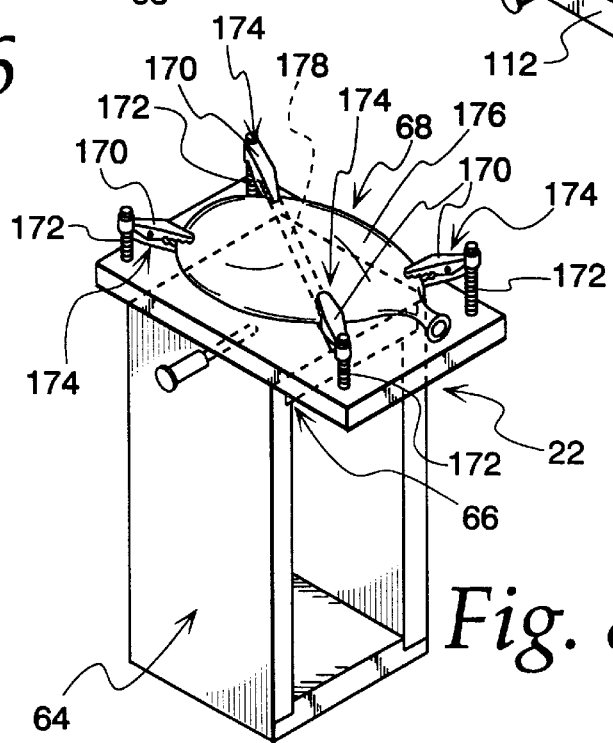

The various practice systems 68, 114–124 will now be described. The practice system 68, as seen in FIGS. 2, 3 and 8, consists of four clamps 170 situated at the corners of the platform 66. Each clamp 170 consists of a threaded, upright post 172 with a jaw assembly 174 threaded to the post 172 so as to be selectively vertically adjustable. A flexible element 176, in this case a latex balloon, is simultaneously engaged by at least two of the clamps 170 and more preferably by all four of the clamps 170 so as to be placed in a relatively taut state. Cutting, suturing, and tissue manipulation can be practiced using this practice system 68.

Alternatively, a tube 178 can be operatively held by spaced clamps 170 to facilitate practicing of cutting and suturing of vessels.

Figure 7:
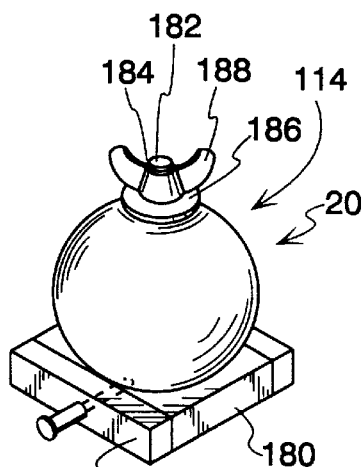

The practice system 114, as shown in FIGS. 2, 3 and 7, consists of a platform 180 with a post 182 embedded therein and projecting vertically upwardly from the platform 180. The upper end 184 of the post 182 is threaded to accept a washer 186 and wing nut 188. With the wing nut 188 and washer 186 removed, the post 182 can be directed through a piece of fruit, such as an orange 190. The wing nut 188 and washer 186 can be assembled to hold the orange 190 firmly in place.

With this model, procedures can be performed to incise the skin of the orange until the pulp is exposed. The incision can be extended with a scissors. The skin can be separated from the pulp using tunneling or prying techniques and peeled off without damaging the pulp. The individual pulp segments of the orange can then be separated.

The practice system 116, as shown in FIGS. 2, 3 and 9, consists of a peg board 194 which is mounted to a platform 196. The board 194 has a regular arrangement of pegs 198 projecting upwardly therefrom. A series of annular beads 200 are provided which are slidable selectively over the individual pegs 198. With this arrangement, the operator can pick up the beads 200, as with the dominant hand, and stack them on the various pegs 198. The beads 200 can be picked up with the dominant hand and placed on the pegs 198 to form letters or other geometric shapes. As a further exercise, the individual beads 200 can be picked up with the non-dominant hand and transferred to the dominant hand to repeat the above exercises.

The practice system 118, as seen in FIG. 11, consists of a series of formed wires 204, 206, 208 which each project upwardly to a free end 210, 212, 214. The wire 204 is formed into an inverted U shape. Beads 216 are provided which can be penetrated by the wire 204 to slide therealong. The operator can manipulate the beads 214 around the shape of the wire 204. Alternatively, a ring 218 can be used in the same manner. The same procedures can be followed on the wire 206, which has a double coil shape, and the wire 208 which has a reverse bend. In each case the beads 216 or rings 218 are manipulated past the free ends 212, 214 to be repositioned so as to follow the curvature of the wires 206, 208.

The practice system 120 shown in FIG. 10, consists of a series of progressively longer eyelets 220, 222, 224 through which a tube 226, simulating a vessel, is passed. The operator can practice cutting and suturing of the tube 226. Alternatively, a pipe cleaner 228 can be provided and manipulated through the tube 226 between and beyond the ends 230, 232 thereof.

The practice system 122, shown in FIG. 13, consists of nine ring stack subassemblies 234, each consisting of a bottom ring 236, a top ring 238, and an intermediate ring 240. The rings 236, 238, 240 in each stack 234 can be made of different colors to facilitate practicing of visual discernment of depth. The ring stacks 234 are arranged in a three-by-three array with the axes of the rings 236, 238, 240 substantially parallel. The operator can practice passing an instrument through the rings 236, 238, 240 between stacks 234 at different selected levels. For example, the dominant hand can pass a forceps or probe between rings 236, 238, 240 in two or three different levels using the color code as a marker. A suture can be passed between two rings 236, 238, 240 and picked up with the non-dominant hand and tied gently over the rings 236, 238, 240.

Figure 14:
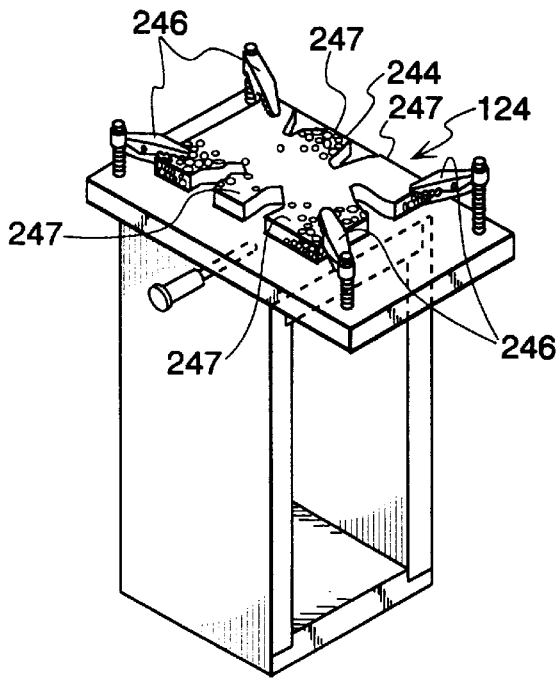

The practice system 124, shown in FIG. 14, consists of a fingered sponge material 244 which is held by a pair of spaced clamps 246. The fingers 247 on the sponge 244 can be repositioned and sewn together to practice suturing.

In FIG. 12, a modified form of platform is shown at 250. The platform 250 has a body 252 with a central turntable support 254 that is pivotable relative to the body about a vertically extending axis 256. With this arrangement, the practice systems 68, 114–124 can be mounted to the turntable support 254 so that the orientation of the practice system around the axis 256 can be varied.

Figure 15:
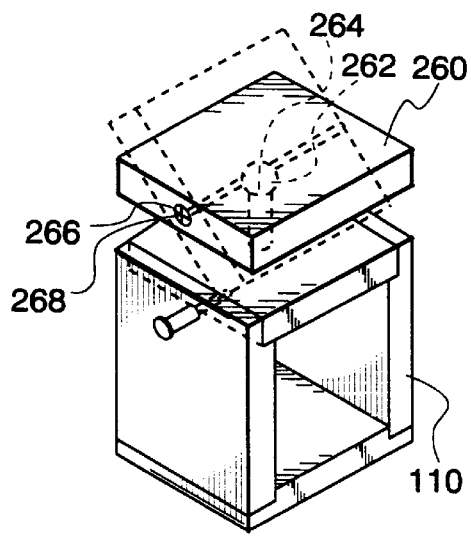
FIG. 15 is a perspective view of a model, according to the present invention, showing a ball and socket connection between a base and platform which define the model.

In FIG. 15, a platform 260 is shown which is mounted to the base 110 through a ball 262 and socket 264 which allows the platform 260 to pivot universally relative to the base 110 so that any desired orientation of the platform 260 relative to the base 110 can be set.

Alternatively, a pin 266 can be directed through the platform 26, the ball 262, and the socket 264 so that the platform 260 is pivotable relative to the base about a single, horizontal axis 268.

Figure 16:
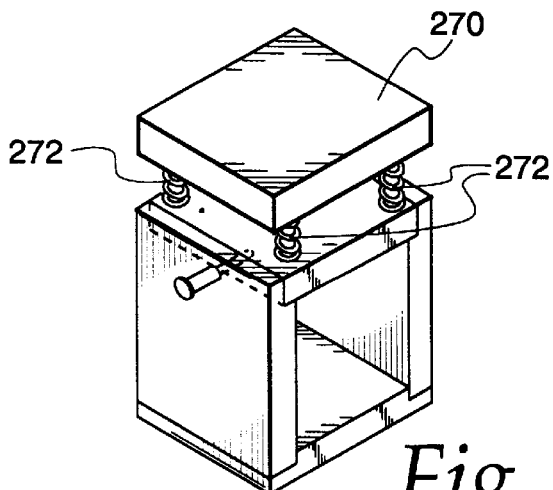
FIG. 16 is a view as in FIG. 15 and showing a spring-type connection between a base and platform according to the present invention.

In FIG. 16, a platform 270 is shown mounted on the base 110 through a plurality of coil springs 272. Accordingly, when pressure is applied to the platform 270 during a procedure, this pressure causes a universal repositioning of the platform 270 relative to the base as would an organ under this same pressure. The force of the spring 272 is chosen so that the platform 270 repositions under a force that would normally cause a like repositioning of body organs.

Figure 4:
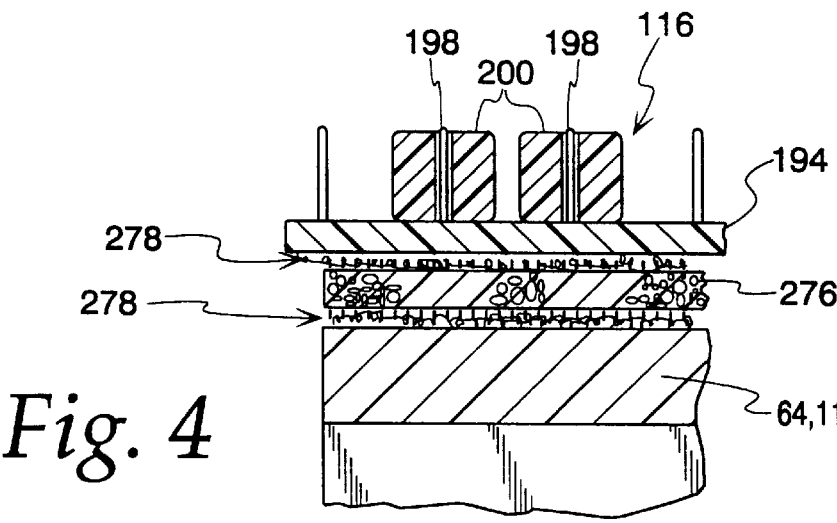
FIG. 4 is an enlarged, fragmentary, cross-sectional view of one of the models taken along line 4—4 of FIG. 3.

FIG. 4 shows a further modified form of mount structure, for in this case the practice system 116. A foam block 276 is interposed between the base 64, 110, 112 and the board 194. A hook and loop fastener 278 is used to connect the foam block 276 to each of the base 64, 110, 112 and the board 194. The foam block 276 permits the board 194 to reposition universally relative to the base 64, 110, 112 under an applied force during a practice procedure to authentically simulate the interaction of the particular medical instrument with a body organ.

Figure 17:
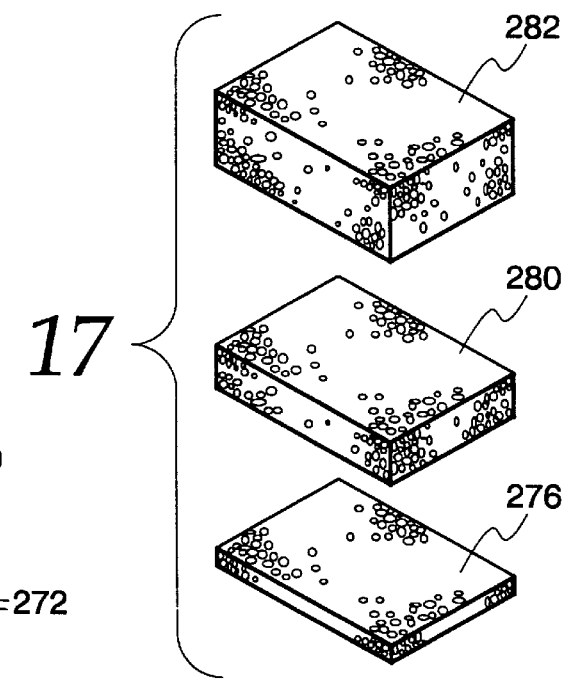
FIG. 17 is a perspective view of a series of flexible pads that can be placed between bases and platforms, according to the present invention.

The system can be sold with a series of blocks 276, 280, 282, as shown in FIG. 17. Each block 276, 280, 282 has a different configuration. The blocks 276, 280, 282 are shown to have different thicknesses. By using the thicker block 282, the particular practice system used is elevated and is supported in a more flexible manner than with the thinner blocks 276, 280. The blocks 280, 282 can be connected to the appropriate base and platform either permanently or removably through the use of hook and loop-type fastener.

It should be understood that while a modular system with interchangeable elements is desirable, the models 20-30 could all be constructed with a fixed configuration.

Various other features are incorporated into the inventive apparatus 10. For example, additional clamps 288 are provided at various locations around the periphery of the frame 12. As seen in FIGS. 2 and 3, the clamps 288 can be used to engage the balloon 176, or any other device within the working space 14, to increase the tension on the balloon 176. The clamps 288 are carried on cords 290 which project through the frame. A conventional-type locking device 292 can be provided on the cords 290 to limit movement of the cords 290 back into the working space 14. Accordingly, the user can operatively engage the clamp 288 within the working space 14 and draw the cord 290 outwardly to produce the desired tension, and thereafter apply the clamp 292.

Upright posts 294 project upwardly from the frame 12 and can be used to practice loop formation, such as a roeder loop knot 296.

Other procedures, such as morcellation, can be practiced in the working space 14.

The foregoing disclosure of specific embodiments is intended to be illustrative of the broad concepts comprehended by the invention.

I claim:

1. A training apparatus comprising:

a frame defining a working space simulating a body cavity, the frame having an access opening in communication with the working space to allow introduction of an instrument to the working space from externally of the working space;

a first model upon which a procedure can be performed with an instrument to at least one of a) simulate a medical procedure and b) practice a movement that may be encountered in the performance of a medical procedure; and cooperating surfaces on the first model and frame which guide movement of the first model in a predetermined path relative to the frame to allow the first model to be selectively repositioned relative to the access opening in the frame.

2. The training apparatus according to claim 1 wherein the frame comprises an elongate rail defining the cooperating surface on the frame which engages the cooperating surface on the first model and guides the first model in a substantially straight line in the predetermined path.

3. The training apparatus according to claim 1 further comprising a locking mechanism for selectively releasably fixing the first model in a plurality of different positions relative to the frame.

4. The training apparatus according to claim 1 wherein the cooperating surfaces on the frame comprises surfaces which can be selectively engaged with the cooperating surface on the first model to selectively guide the first model in first and second independent paths relative to the frame.

5. The training apparatus according to claim 1 wherein the frame comprises three rails each having a surface to engage the cooperating surface on the first model and guide the first model selectively in one of three different predetermined paths, with each of the predetermined paths being substantially straight, and the three predetermined paths are substantially parallel to each other.

6. The training apparatus according to claim 1 wherein the first model comprises a first base, a first platform with an exposed surface, and a resilient element between the first base and first platform which deforms to allow the platform to universally reposition relative to the base, and the cooperating surface on the first model is defined by the base.

7. The training apparatus according to claim 6 wherein the first platform is removably connected to the first base and in combination with a second base having a different configuration than the first base to which the first platform is capable of being removably connected.

8. The training apparatus according to claim 1 wherein the first model comprises a first base and a first platform operably connected to the first base for selective guided movement relative to the first base.

9. The training apparatus according to claim 8 wherein at least a part of the first platform is connected to the first base for pivoting movement relative to the first base around a first axis.

10. The training apparatus according to claim 1 wherein the first model comprises a first base, a first platform on the first base, and a practice system on the first platform.

11. The training apparatus according to claim 10 wherein the practice system comprises a plurality of elements each having an opening with an axis and the axes of a plurality of the openings are non-coincident.

12. The training apparatus according to claim 11 wherein the axes of a plurality of the openings are coincident.

13. The training apparatus according to claim 11 wherein a plurality of the openings are defined by a plurality of the elements which have an annular shape.

14. The training apparatus according to claim 13 wherein a plurality of the elements that have an annular shape are stacked, one on the other to define a stack subassembly.

15. The training apparatus according to claim 14 wherein there are a plurality of stack subassemblies on the first platform.

16. The training apparatus according to claim 10 wherein the practice system on the first platform comprises a cantilevered wire element on the first platform and having a body with a free end and an annular element having an opening to receive the free end of the body and at least a part of the body.

17. The training apparatus according to claim 16 wherein the at least part of the body is non-straight.

18. The training apparatus according to claim 16 wherein the at least part of the body is curved.

19. The training apparatus according to claim 16 wherein the at least part of the body has multiple curves formed thereon.

20. The training apparatus according to claim 10 wherein the practice system comprises a flexible tube and a support for maintaining at least a part of the flexible tube in spaced relationship to the first platform.

21. The training apparatus according to claim 10 wherein the practice system comprises a flexible element and first and second clamps which engage the flexible element to maintain at least part of the flexible element spaced from the first platform.

22. The training apparatus according to claim 21 wherein the flexible element is in a tensioned state between the first and second clamps.

23. The training apparatus according to claim 21 wherein the practice system comprises third and fourth clamps which each engage the flexible element.

24. The training apparatus according to claim 21 wherein the first clamp in an operative state is spaced from the first platform and the first clamp is attached to the platform so that the spacing between the first clamp and the first platform can be selectively varied.

25. The training apparatus according to claim 21 wherein there is a clamp on the frame that is connected to the frame independently of the first model for engaging the flexible element.

26. The training apparatus according to claim 10 wherein the practice system comprises a piece of fruit on the platform.

27. The training apparatus according to claim 10 wherein the practice system comprises a peg board and a plurality of discrete elements which can be placed in selected locations on the peg board.

28. The training apparatus according to claim 1 further comprising a post projecting in cantilever fashion from the frame to facilitate tying of knots in an elongate flexible element.

29. The training apparatus according to claim 1 further comprising a camera mounted to the frame for photographing the working space.

30. The training apparatus according to claim 29 wherein there is a mount structure on the frame for guiding movement of the camera in a predetermined manner relative to the frame.

31. The training apparatus according to claim 1 further comprising a resettable timer on the frame.

32. The training apparatus according to claim 1 wherein the access opening on the frame is at least partially covered by a flexible membrane to simulate live tissue.

33. The training apparatus according to claim 32 further comprising a medical instrument which is directed through the flexible membrane into the working space.

34. The training apparatus according to claim 32 further comprising a laparoscopic camera which is directed through the flexible membrane into the working space.

35. The training apparatus according to claim 34 further comprising a monitor for projecting a visible image of the working space generated by the laparoscopic camera.

36. The training apparatus according to claim 1 wherein the frame defines a ledge at least partially around the access opening and further comprising a framed membrane which is removably supported on the ledge to at least partially cover the access opening.

37. The training apparatus according to claim 1 wherein the first model comprises a first base, a first platform and a first resilient element acting between the first base and first platform.

38. The training apparatus according to claim 37 wherein the first resilient element comprises foam.

39. The training apparatus according to claim 38 wherein the first resilient element is removably attached to at least one of the first base and the first platform.

40. The training apparatus according to claim 39 wherein the first resilient element is removably attached to the at least one of the first base and the first platform through a hook and loop-type fastener.

41. The training apparatus according to claim 38 wherein the first resilient element is removably attached to each of the first base and the first platform.

42. The training apparatus according to claim 41 wherein the first resilient element maintains a first predetermined spacing between the first base and first platform and further comprising a second resilient element which acts between the first base and first platform with the first resilient element removed from both the first platform and first base, and the second resilient element has a different configuration than the first resilient element to maintain a second predetermined spacing between the first base and first platform that is different than the first predetermined spacing.

43. The training apparatus according to claim 1 further comprising a source of illumination within the working space.

* * * * *